US011374475B2

(12) United States Patent
Lee et al.

(10) Patent No.: US 11,374,475 B2
(45) Date of Patent: Jun. 28, 2022

(54) MOTOR AND WASHING MACHINE HAVING THE SAME

(71) Applicant: SAMSUNG ELECTRONICS CO., LTD., Suwon-si (KR)

(72) Inventors: Jinki Lee, Suwon-si (KR); Jaejun Lee, Suwon-si (KR); Minseong Im, Suwon-si (KR); Sukwon Jeong, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 283 days.

(21) Appl. No.: 16/819,286

(22) Filed: Mar. 16, 2020

(65) Prior Publication Data
US 2020/0295645 A1 Sep. 17, 2020

(30) Foreign Application Priority Data

Mar. 14, 2019 (KR) ........................ 10-2019-0029286

(51) Int. Cl.
| | |
|---|---|
| *H02K 29/03* | (2006.01) |
| *H02K 1/2786* | (2022.01) |
| *H02K 21/22* | (2006.01) |
| *D06F 23/04* | (2006.01) |
| *D06F 37/40* | (2006.01) |
| *D06F 37/30* | (2020.01) |

(52) U.S. Cl.
CPC ............ *H02K 29/03* (2013.01); *D06F 23/04* (2013.01); *D06F 37/304* (2013.01); *D06F 37/40* (2013.01); *H02K 1/2786* (2013.01); *H02K 21/22* (2013.01); *H02K 2213/03* (2013.01)

(58) Field of Classification Search
CPC ..................................................... H02K 29/03
See application file for complete search history.

(56) References Cited

U.S. PATENT DOCUMENTS

2017/0327990 A1   11/2017   Lee et al.

FOREIGN PATENT DOCUMENTS

| JP | 2003-299282 | 10/2003 |
|---|---|---|
| JP | 2010-004663 | 1/2010 |
| JP | 2013-090443 | 5/2013 |
| KR | 10-064084 | 11/2006 |
| KR | 10-1431829 | 8/2014 |
| KR | 10-2017-0012016 | 2/2017 |
| KR | 10-2018-0113296 | 10/2018 |

OTHER PUBLICATIONS

International Search Report dated Jul. 10, 2020 in International Patent Application No. PCT/KR2020/003397.

*Primary Examiner* — Jason Y Ko
(74) *Attorney, Agent, or Firm* — Staas & Halsey LLP

(57) ABSTRACT

A motor of the invention includes a stator having a slot wound with a coil and a circular shaped housing accommodating the stator, and a rotor disposed on an inner surface of the housing and spaced apart from the slot and having a plurality of permanent magnets having the same number as magnetic poles and having different magnetic polarities. Each of the plurality of permanent magnets has a length corresponding to a first angle according to the number of magnetic poles. The plurality of permanent magnets are spaced apart from each other at a third angle according to the first angle and a second angle corresponding to the number of magnetic poles. The first, second, third angles of the motor refer to a center point of the housing as an angle reference point. The motor of an embodiment may be a motor provided in a washing machine.

17 Claims, 14 Drawing Sheets

FIG. 11

|  | CONVENTIONAL | PROPOSED | REMARKS |
|---|---|---|---|
| COUNTER ELECTROMOTIVE FORCE [V] | 33.1 | 30.9 | 6.5% DECREASE |
| COGGING TORQUE [$Nm_{pk}$-$_{pk}$] | 0.74 | 0.08 | 88.8% DECREASE |
| TORQUE RIPPLE [$Nm_{pk}$-$_{pk}$] | 0.95 | 0.25 | 74.1% DECREASE |
| NOISE(WASHING) [dBA] | 49.4 | 48.8 | 0.6dBA DECREASE |
| NOISE(DEHYDRATING_ ACCELERATION200) [dBA] | 55.7 | 43.1 | 12.6dBA DECREASE |
| NOISE(DEHYDRATING_ CONSTANT SPEED 700) [dBA] | 50.0 | 48.7 | 1.3dBA DECREASE |
| ROTOR WEIGHT [g] | 1320 | 1240 | 6.1% DECREASE |

MOTOR AND WASHING MACHINE HAVING THE SAME

CROSS-REFERENCE TO RELATED APPLICATION(S)

This application is based on and claims priority under 35 U.S.C. § 119 to Korean Patent Application No. 10-2019-0029286, filed on Mar. 14, 2019 in the Korean Intellectual Property Office, the disclosure of which is incorporated by reference in its entirety.

BACKGROUND

1. Technical Field

Embodiments of the disclosure relate to a motor and washing machine having the same for reducing noise and vibration.

2. Description of the Related Art

A washing machine is a device for washing, rinsing and dehydrating laundry or drying the laundry by rotating a cylindrical rotating tub containing laundry.

A washing machine includes a front loading washing machine in which a rotating tub is arranged horizontally and a laundry inlet is formed in the front, and a top loading washing machine in which a rotating tub is arranged vertically and a laundry inlet is formed at the top. That is, the washing machine adopts any one of the two methods described above to wash the laundry.

Such a washing machine includes a motor, and rotates the rotating tub by using the motor, and adjusts rotation speed of the rotating tub by controlling the speed of the motor during the rotation of the rotating tub.

The motor includes a rotor provided with a plurality of permanent magnets, the plurality of permanent magnets forming magnetic poles of the N pole and the S pole. In this case, one permanent magnet is formed to have a plurality of magnetic poles with respect to a void surface.

When the permanent magnet is magnetized, dead zones are formed between a plurality of magnetic poles, but dead zones having different sizes are formed for the permanent magnets, which causes a large cogging torque and a large torque ripple.

The large cogging torque and large torque ripple cause noise and vibration when the motor rotates.

SUMMARY

One aspect includes a rotor having a plurality of permanent magnets arranged at regular intervals and provides a motor and a washing machine having the same each of the plurality of permanent magnets of the rotor exhibiting one magnetic polarity with respect to the void surface.

Another aspect provides a motor and a washing machine having the curved surface of the face of each permanent magnet of the rotor facing the stator.

In accordance with an aspect of the disclosure, a motor comprises: a stator having slots around which coils are wound; and a rotor comprising a housing having a circular shape and accommodating the stator and a plurality of permanent magnets disposed on an inner surface of the housing to be spaced apart from each other while facing the slots, the plurality of permanent magnets provided corresponding in number to a number of magnetic poles and having different magnetic polarities, wherein each of the plurality of permanent magnets has a length corresponding to a first angle according to the number of magnetic poles, the plurality of permanent magnets are spaced apart from each other at a third angle according to the first angle and a second angle corresponding to the number of magnetic poles, and wherein the first, second, and third angles of the motor have a center point of the housing as an angle reference point.

The plurality of permanent magnets may be disposed such that magnetic polarities of surfaces of the plurality of permanent magnets facing the slots are alternatively indicated as a first magnetic polarity and a second magnetic polarity.

Each of the permanent magnets may include a first surface adjacent to the slot, a second surface adjacent to an inner circumferential surface of the housing, a third surface connecting one side of the first surface to one side of the second surface, and a fourth surface connecting an other side of the first surface to another side of the second surface, and the first angle is an angle between a line connecting to the third surface and a line connecting to the fourth surface of each of the permanent magnets at the center point of the housing, and the third angle is an angle between lines respectively connecting to opposing surfaces of two permanent magnets adjacent to each other among the plurality of permanent magnets at the center point of the housing.

The first surface may have a length corresponding to a first radius from the center point of the housing to the first surface and the first angle, and the second surface may have a length corresponding to a second radius from the center point of the housing to the second surface and the second angle.

The first angle may be between 10 and 13 degrees, the second angle may be an angle obtained by dividing the number of the magnetic poles by 360 degrees, and the third angle may be an angle obtained by subtracting the first angle from the second angle.

The plurality of permanent magnets are spaced apart from each other at a distance corresponding to the third angle.

The preset pole-arc-to-pole-pitch ratio is a value in a range of 0.67 to 0.87, the length of the first surface is approximately 19.200 mm, and the length of the second surface is approximately 20.394 mm, and the length of the third surface and the fourth surface are approximately 6 mm.

Each of the permanent magnets may include a first surface adjacent to the slot, a second surface adjacent to an inner circumferential surface of the housing, a third surface connecting one side of the first surface to one side of the second surface, and a fourth surface connecting an other side of the first surface to another side of the second surface, a first curved surface provided between the first surface and the third surface, and a second curved surface provided between the second surface and the fourth surface.

A ratio of the number of the plurality of the permanent magnets to the number of slots is 4:3.

In accordance with an aspect of the disclosure, a washing machine comprises: a tub; a rotating tub rotatably disposed in the tub; and a motor configured to apply driving force to the rotating tub, and comprising a stator having slots wound with coils and a rotor including a housing having a circular shape and accommodating the stator and a plurality of permanent magnets disposed on an inner surface of the housing to be spaced apart from each other while facing the slots, the plurality of permanent magnets provided corresponding in number to a number of magnetic poles and having different magnetic polarities, wherein each of the plurality of the permanent magnets has a length corresponding to the number of magnetic poles, a preset pole-arc-to-pole-pitch ratio, and a preset radius, and wherein the plurality of the permanent magnets are spaced apart from each other at a distance corresponding to the determined length, the number of magnetic poles, and the preset radius.

The washing machine further include a pulsator rotatably disposed in the rotating tub; and wherein the motor delivers the driving force selectively to the rotating tub and the The preset pole-arc-to-pole-pitch ratio is a value in a range of 0.67 to 0.87, the preset radius is about 99.5 mm, and the determined length is approximately 6.25 mm.

The determined length is a length corresponding to a first angle determined by the number of magnetic poles and the preset pole-arc-to-pole-pitch ratio, and the determined distance is a distance corresponding to the first angle and a third angle determined by a second angle corresponding to the number of magnetic poles, and the first angle is an angle between lines respectively connecting to opposite side surfaces of each of the permanent magnets at a center point of the housing, and the third angle is an angle between lines respectively connecting to opposing surfaces of two permanent magnets adjacent to each other among the plurality of permanent magnets at the center point of the housing.

A ratio of the number of the plurality of the permanent magnets to the number of the slots is 4:3.

The motor may be a motor of the direct drive system (DD).

The rotor of the motor may be disposed outside the stator.

The invention can widen the distance between the permanent magnets by mounting one permanent magnet having one magnetic polarity with respect to the void in the housing of the rotor, thereby making it easy to manufacture the rotor.

That is, according to the invention, as the distance between the permanent magnets is widened, the permanent magnets may be mounted in the housing as a jig during manufacture, thereby keeping the distances between the permanent magnets constant. Therefore, the present invention can easily perform the manufacturing process for mounting the permanent magnet in the housing.

In addition, according to the invention, as the spacing between the permanent magnets is widened, the bond applied in the housing of the rotor can be visually confirmed by the manufacturer, so that the manufacturer can easily recognize the manufacturing defect of the rotor during the manufacturing process. This can reduce motor quality defects and failures.

In addition, the invention can prevent the formation of a dead zone between adjacent permanent magnets having different magnetic polarities as it is not necessary to divide and install one permanent magnet having a plurality of magnetic polarities in the housing.

The invention can fundamentally prevent the non-uniformity of the void magnetic flux density by the dead zone formed between the permanent magnets, and therefore it can reduce the noise or vibration generated by the motor.

As described above, according to the invention, since each of the plurality of permanent magnets of the rotor exhibits one magnetic polarity with respect to the void surface and the plurality of permanent magnets are arranged at regular intervals, the cogging torque and torque ripple can be reduced compared to the counter electromotive force reduction. This can reduce the noise or vibration of the motor.

As the noise and vibration of the motor are reduced, the noise and vibration generated from home appliances such as a washing machine may also be reduced.

The invention can reduce the size of the permanent magnet disposed in the housing of the rotor as the distance between the plurality of permanent magnets is widened, and can reduce the weight of the rotor, thereby the starting and acceleration characteristics of the motor can be improved.

The invention can improve the quality and merchandise of the motor and the washing machine, further increase the user's satisfaction, improve the stability of the washing machine and secure the competitiveness of the product.

BRIEF DESCRIPTION OF THE DRAWINGS

These and/or other aspects of the disclosure will become apparent and more readily appreciated from the following description of embodiments, taken in conjunction with the accompanying drawings of which:

FIG. 11 is a table illustrating numerical counter electromotive force, cogging torque, torque ripple and noise of a motor provided in a washing machine according to an embodiment, and counter electromotive force, cogging torque, torque ripple, and noise of a motor provided in a conventional washing machine.

DETAILED DESCRIPTION

Figure 1:
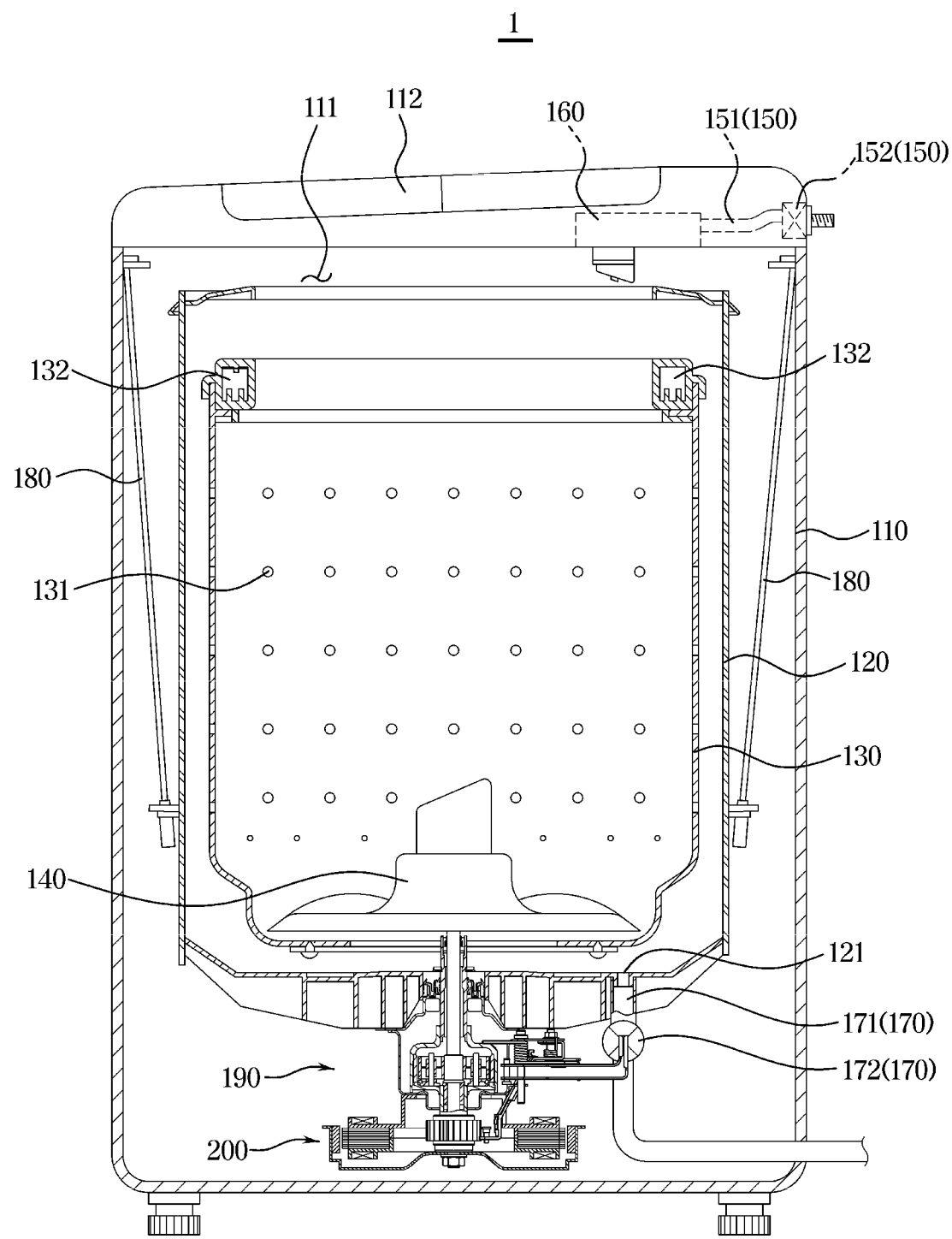
FIG. 1 is an exemplary view of a washing machine according to one embodiment.

This specification does not describe all elements of the embodiments of the present disclosure and detailed descriptions on what are well known in the art or redundant descriptions on substantially the same configurations may be omitted.

The term "part," as used herein, may be implemented in software or hardware. According to embodiments, a plurality of 'parts' may be implemented as one component, or one 'part' may include a plurality of components.

Throughout the specification, when an element is referred to as being "connected to" another element, it may be directly or indirectly connected to the other element and the "indirectly connected to" includes being connected to the other element via a wireless communication network.

Also, it is to be understood that the terms "include" and "have" are intended to indicate the existence of elements disclosed in the specification, and are not intended to preclude the possibility that one or more other elements may exist or may be added.

In this specification, terms "first," "second," etc. are used to distinguish one component from other components and, therefore, the components are not limited by the terms.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

Hereinafter, embodiments of the present disclosure will be described in detail with reference to the accompanying drawings.

Figure 2:
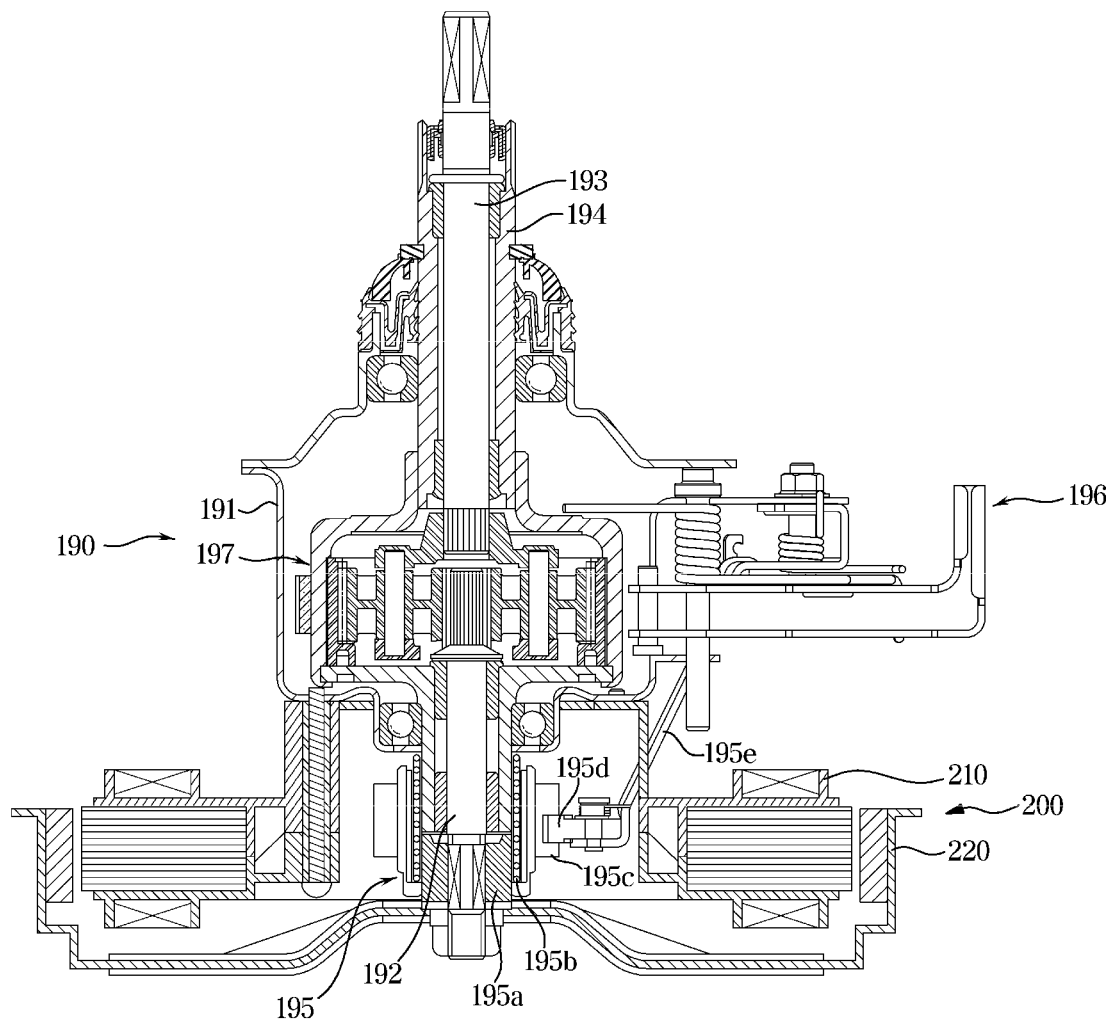
FIG. 2 is a cross-sectional view of the clutch and the motor provided in the washing machine according to one embodiment.
Figure 3:
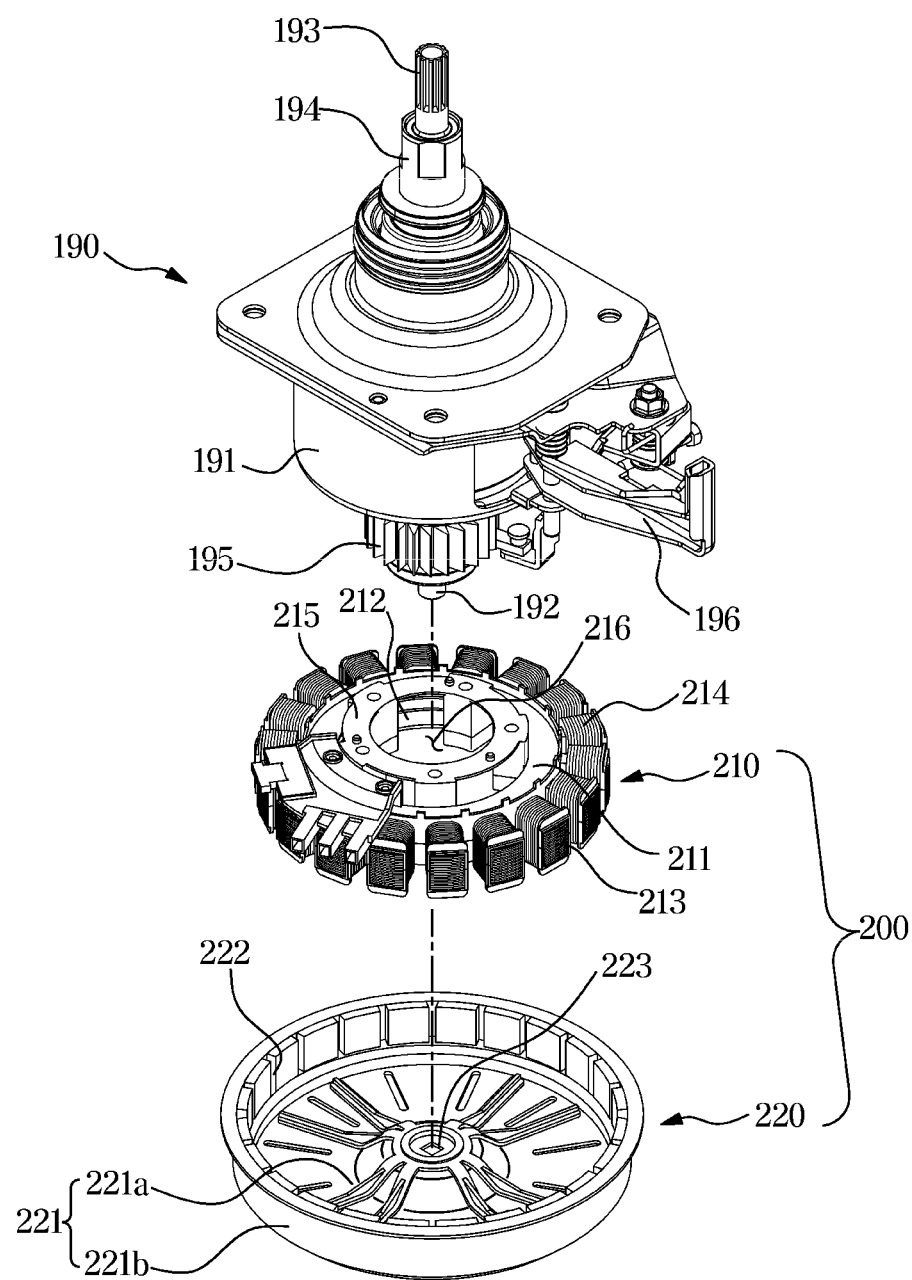
FIG. 3 is a perspective view of a clutch and a motor provided in a washing machine according to one embodiment.
Figure 4:
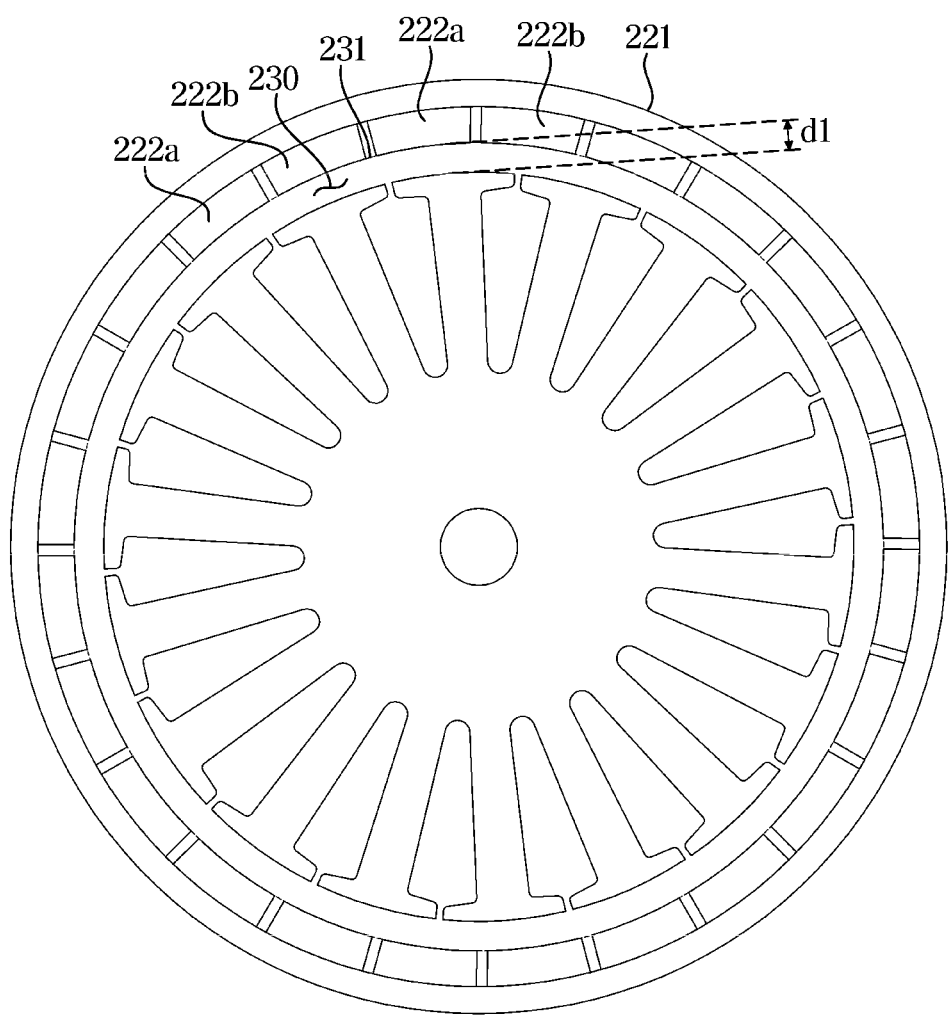
FIG. 4 is a schematic view of a motor provided in a washing machine according to one embodiment.

FIG. 1 is an exemplary view of a washing machine according to one embodiment, FIG. 2 is a cross-sectional view of the clutch and the motor provided in the washing machine according to one embodiment, FIG. 3 is a perspective view of a clutch and a motor provided in a washing machine according to one embodiment, and FIG. 4 is a simplified diagram of a motor provided in a washing machine according to one embodiment.

The washing machine according to an embodiment performs an operation based on the weight of laundry and a washing program and an option selected by a user.

The laundry program may include standard laundry, bedding laundry, boiling, wool laundry, towel laundry, rapid laundry, and the options may include at least one of the amount of water, the temperature of the water, the time of the washing stroke, the number of rinsing strokes, the intensity of the dehydrating stroke and the time of the dehydrating stroke.

An embodiment describes a top loading washing machine in which a rotating tub is vertically disposed in a main body and a laundry inlet is formed on an upper part of the main body.

Referring to FIG. 1, the washing machine 1 includes a cabinet 110 forming an exterior, a water tank 120 disposed inside the cabinet 110 and storing wash water, and a rotating tub 130 rotatably disposed in the water tank 120 to accommodate laundry and a pulsator 140 rotatably disposed to generate water flow by the rotation.

An inlet 111 is provided in the upper part of the cabinet 110, and a movable door 112 is provided. Here, the inlet 111 is a place where the laundry is input and discharged, it can be opened and closed by the door 112.

The upper portion of the water tank 120 is provided with a water supplier 150 for receiving external water and delivering the supplied water to the water tank 120.

The water supplier 150 includes a water supply pipe 151 connected to an external water supply source (not shown), and a water supply valve 152 provided in the water supply pipe 151 to allow or block the supply of water.

The washing machine 1 further includes a detergent supplier 160 storing the detergent and supplying the stored detergent to the water tank 120 and the rotating tub 130.

That is, the water supplied through the water supply pipe 151 of the water supplier may move into the water tank 120 and the rotating tub 130 together with the detergent via the detergent supplier 160.

The rotating tub 130 is provided in an open cylindrical shape and includes a plurality of holes 131 provided on an outer circumferential surface thereof. Here, the plurality of holes 131 allow the inner space of the rotating tub 130 and the inner space of the water tank 120 to communicate with each other so that the plurality of holes make sure the water can move between the inner space of the rotating tub 130 and the inner space of the water tank 120.

An upper portion of the rotating tub 130 may be equipped with a balancer 132 to offset the unbalanced load generated in the rotating tub 130 when the rotating tub 130 rotates so that the rotating tub 130 rotates stably.

The pulsator 140 performs forward rotation or reverse rotation and generates water flow. At this time, the laundry in the rotating tub 130 by the water flow of the pulsator 140 may be stirred with the wash water.

The bottom portion of the water tank 120 is provided with a drain 121 to discharge the wash water stored in the water tank 120 to the outside.

The washing machine 1 may further include a drain 170 for discharging the water of the water tank 120 to the outside. That is, the drain 170 may include a drain pipe 171 connected to the drain hole 121 of the water tank 120 and a drain valve 172 for controlling the drainage of the drain pipe 171.

The washing machine 1 may further include a suspension device (ie, a damper) 180 connecting the lower side of the outer surface of the water tank 120 and the inner upper portion of the cabinet 110. The water tank of the washing machine may be supported in a state in which the cabinet 110 is hung by the suspension device. The suspension 180 may damp vibration generated in the water tank 120 during washing or dehydration.

The washing machine 1 further includes a clutch 190 and a motor 200 for rotating at least one of the rotating tub 130 and the pulsator 140 to allow the washing machine to perform various strokes. In the embodiment, a direct connection structure in which the motor 200 and the clutch 190 are arranged in a vertical line will be described as an example.

As shown in FIG. 2, the clutch 190 is disposed between the motor 200 and the water tank 120 and receives a driving force from the motor 200 to transfer the driving force of the motor 200 to the rotating tub 130 and the pulsator 140 selectively.

The clutch 190 includes a housing 191 that protects the internal configuration of the clutch. A portion of the driving shaft 192 protrudes from the lower portion of the housing 191 of the clutch, and a portion of the washing shaft 193 and the dehydration shaft 194 protrude from the upper portion thereof.

The driving shaft 192 receives the driving force from the motor 200. That is, the driving shaft 192 allows the power generated from the motor 200 to be transmitted to the washing shaft 193 and the dehydration shaft 194.

The driving shaft 192 is a rod-shaped shaft, and always rotates integrally with the motor 200.

The clutch 190 may include a gear assembly 195 provided in the dehydration shaft 194 to reduce the rotation of the driving shaft 192 and transmit the power to the washing shaft 193 and a brake assembly 196 provided outside the dehydration shaft 194 to brake rotation of the washing tub 130.

Gear assembly 195 may include a boss 195a coupled to the driving shaft 192 having the same diameter as the dehydration shaft 194, a clutch spring 195b surrounding the dehydration shaft 194 and the boss 195a and selectively transmitting the driving force of the driving shaft 192 to the dehydration shaft 194, a sleeve 195c provided outside the clutch spring 195b, a ratchet 195d for changing the diameter of clutch spring 195b and a clutch lever 195e connected with the ratchet 195d.

The boss 195a of the gear assembly 195 is a component to which the driving force of the motor 200 is primarily transmitted, and always rotates integrally with the motor 200.

Looking at the operation of the gear assembly 195, the clutch lever 195e is pulled to one side during the washing stroke or the rinsing stroke so that the ratchet 195d contacts the sleeve 195c, and the ratchet 195d rotates the sleeve 195c in the direction in which the clutch spring 195b is released. When the sleeve 195c is rotated by the ratchet 195d as described above, the clutch spring 195b inside the sleeve 195c is released and the driving force of the driving shaft 192 is not transmitted to the dehydration shaft 194. As a result, the washing shaft 193 rotates but the dehydration shaft 194 does not rotate, the pulsator 140 connected to the washing shaft 193 may rotate, but the washing tank 130 connected to the dehydration shaft 194 cannot be rotated.

Conversely, if the clutch lever 195e is pulled to the other side during the dehydration stroke, the ratchet 195d is detached from the sleeve 195c and the clutch spring 193b, which has been loosened by the rotation of the sleeve 195c, is tightened again. In addition, the clutch spring 193c transmits the rotational force of the driving shaft 192 to the dehydration shaft 194. As a result, both the pulsator 140 connected to the washing shaft 193 and the washing tub 130 connected to the dehydration shaft 194 can rotate.

The configuration of the gear assembly 195 of the clutch 190 is not limited to the above components, and may be variously changed using components for switching between the washing shaft and the dehydrating shaft.

In the housing 191 of the clutch 190, a gear unit 197 for controlling the rotation speed of the washing shaft and the dehydration shaft may be further provided.

The gear unit 197 of the clutch 190 may be implemented by variously changing between components capable of adjusting the rotational speed of the washing shaft and the dehydration shaft.

As shown in FIG. 2 and FIG. 3, the motor 200 is provided at the lower end of the water tank 120, and generates driving force when power is applied, and supplies the generated driving force to at least one of the rotating tub 130 and the pulsator 140.

The motor 220 may be a direct drive motor.

The motor 200 includes a stator (ie, stator 210) and a rotor (ie, rotor) 220 disposed on the outer circumference of the stator 210. That is, the motor may be an outer rotor type motor.

Stator 210 may include an annular base 211, a core 212 disposed along the outer circumference of the base 211, a plurality of slots 213 protruding outward from the core 212 with respect to the radial direction of the stator 210, a coil 214 wound in each of the plurality of slots 213.

The coil 214 may generate a magnetic field by the current flowing through the coil, and the plurality of slots 213 may be magnetized by the generated magnetic field.

An upper surface of the base 211 may be provided with a mounting surface 215 formed in an annular shape.

Accordingly, when the stator 210 is coupled with the clutch 190, the clutch 190 may be seated on the mounting surface 215 of the stator 210.

An opening 216 may be provided inside the base 211 and the mounting surface 214 of the stator 210. Accordingly, when the clutch 190 and the stator 210 are coupled, the lower protrusion of the gear assembly 195 may be disposed in the stator 210 through the opening 216.

The rotor 220 wraps the stator 210 on the outside of the stator 210.

The rotor 220 includes a housing 221 forming the exterior of the rotor. The housing 221 may include a circular first surface 221a and a second surface 221b formed at an edge of the first surface 221a and allowing an accommodation space to be formed inside the housing.

The rotor 220 includes a plurality of permanent magnets 222 disposed on an inner surface of the second surface 221b forming an accommodation space among the surfaces of the second surface 221b of the housing 221.

As shown in FIG. 4, in the housing 221 of the rotor 220, a permanent magnet 222a representing the first magnetic polarity through the first surface and a second permanent magnet 222b representing the second magnetic polarity through the first surface may be alternately arranged.

Here, the first magnetic polarity and the second magnetic polarity may be different polarities, the first magnetic polarity may be N polarity, and the second magnetic polarity may be S polarity.

The plurality of permanent magnets 222 may be arranged to face the slot 213 of the stator in the housing 221. At this time, the slot 213 of the stator may be disposed with a gap G at a predetermined distance.

Here, the gap between the slot 213 of the stator and the permanent magnet 222 of the rotor may be a void 230, and the predetermined distance d1 of the void may be approximately 1 mm.

Each of the plurality of permanent magnets has one magnetic pole based on the void surface 231 formed by the void 230.

The number of permanent magnets 222 disposed in the housing of the rotor 220 may be equal to the number of magnetic polarities (ie, the number of magnetic poles) of the rotor 220. For example, if the number of magnetic polarities of the rotor is 24, the number of permanent magnets of the rotor may be 24.

The ratio of the number of the plurality of permanent magnets 222 and the number of the plurality of slots 213 may be about 4:3.

In the present embodiment, the number of the plurality of permanent magnets 222 may be about 24, and the number of the plurality of slots 213 may be about 18.

The plurality of permanent magnets 222 may vary the height of the permanent magnet corresponding to the stacking direction of the rotor and the thickness of the permanent magnet corresponding to the vertical direction of the stacking.

The plurality of permanent magnets 222 electromagnetically interact with the coil 214 of the stator 210. That is, the rotor 220 may rotate by the electromagnetic force generated between the stator 210 and the stator 210. The rotation configuration between the rotor and the stator is omitted in the general technique.

The rotor 220 may further include a coupling hole 223 formed at the center of the first surface 221a of the housing 221. The driving shaft 192 of the clutch 190 may be coupled to the rotor 220 through the coupling hole 223.

That is, the driving shaft 192 is coupled to the coupling hole 223 of the rotor 220, so that the driving shaft 192 and the rotor 220 of the clutch 190 may be coupled to each other.

The driving shaft 192 coupled to the rotor 220 is connected to the washing shaft 193 through the hollow of the dehydration shaft 194, and the laundry shaft 193 may be coupled to the pulsator 140 by passing through the hollow of the dehydration shaft 194.

In addition, a serration (not shown) for coupling the driving shaft 192 may be provided around the coupling hole 223. As a result, the driving shaft 192 and the boss 195a coupled to the serration (not shown) may rotate.

The rotor 220 of the embodiment will be described in detail with reference to FIGS. 5 to 7.

Figure 5:
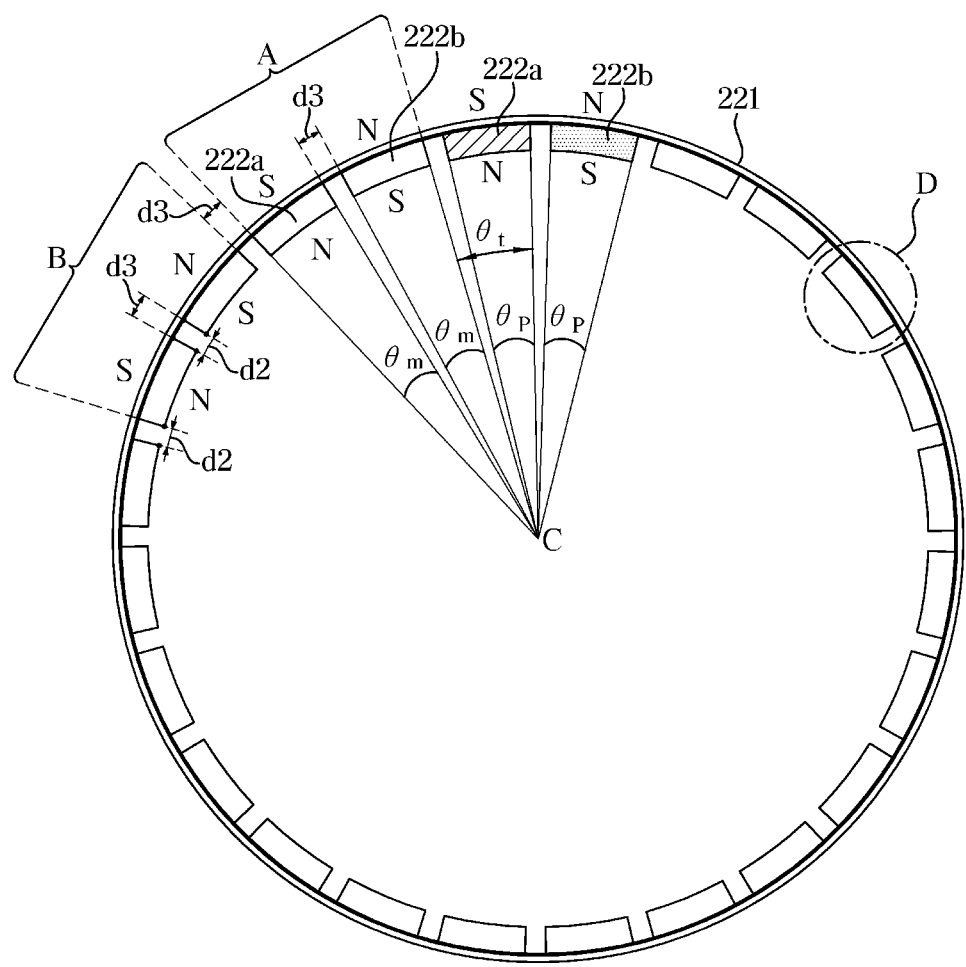
FIG. 5 is an exemplary view of a rotor of a motor provided in a washing machine according to one embodiment.

FIG. 5 illustrates an example of a rotor of a motor provided in a washing machine, and illustrates a plurality of permanent magnets provided in the rotor.

In the housing 221 of the rotor 220, a plurality of permanent magnets are disposed in succession in the circumferential direction of the housing.

Each permanent magnet disposed in the housing has a magnetic polarity different from the inner side and the outer side.

For example, when the inner side of the first permanent magnet 222a has the first magnetic polarity, the outer side of the first permanent magnet 222a may have the second magnetic polarity.

In addition, the inner sides of two permanent magnets adjacent to each other have opposite polarities, and the outer sides of the two permanent magnets adjacent to each other also have opposite polarities to each other.

For example, when the inner side of the first permanent magnet 222a has a first magnetic polarity and the outer side of the first permanent magnet 222a has a second magnetic polarity, an inner side of the second permanent magnet 222b may have a second magnetic polarity, and an outer side of the second permanent magnet 222b may have a first magnetic polarity.

Here, the first magnetic polarity and the second magnetic polarity may be different polarities, the first magnetic polarity may be N polarity, and the second magnetic polarity may be S polarity.

As such, based on the inner side of the plurality of permanent magnets, a plurality of permanent magnets may be disposed in the housing such that two magnetic polarities alternately appear.

In addition, a plurality of permanent magnets may be disposed in the housing such that two magnetic polarities alternate with respect to the outer side of the plurality of permanent magnets.

Each of the plurality of permanent magnets may have one magnetic pole based on the void surface 231 formed by the void 230.

Each of the plurality of permanent magnets may have one magnetic pole based on the void surface 231 formed by the void 230.

The void surface 231 may be an inner side surface of the permanent magnets disposed along the inner circumferential surface of the housing. The plurality of permanent magnets may be spaced apart from each other by a predetermined distance between adjacent permanent magnets. That is, the plurality of permanent magnets are spaced apart from each other by a predetermined distance.

Two permanent magnets adjacent to each other among the plurality of permanent magnets may form one set A for forming magnetic flux with the stator.

The distance between the first permanent magnet 222a and the second permanent magnet 222b constituting one set A may be a predetermined distance.

In addition, the distance between one set A and the neighboring set B may also be a certain distance.

The plurality of permanent magnets may have a width corresponding to the first angle $\Theta p$ based on the center c of the circle forming the inner circumferential surface of the housing 221 of the rotor.

That is, each of the plurality of permanent magnets has a width corresponding to a first angle $\Theta p$ between a line connecting both sides of the permanent magnet at the center c of the circle forming the inner circumferential surface of the housing 221 of the rotor.

Here, the first angle $\Theta p$ may be an angle between 10 degrees and 13 degrees.

In addition, the angle ($\Theta p$) of the first permanent magnet and the second permanent magnet constituting one set (A) and the angle ($\Theta m$) of the first permanent magnet and the second permanent magnet constituting the neighboring set (B) are the same can do.

Since the angles corresponding to the widths of the plurality of permanent magnets are all the same, the following description will be given as $\Theta p$ for the first angle corresponding to the widths of the permanent magnets.

Each of the plurality of permanent magnets having a width corresponding to the first angle $\Theta p$ may be disposed on an inner circumferential surface of the housing 221, but may be disposed at a predetermined interval based on a second angle $\Theta t$ based on a center c of a circle forming an inner circumferential surface of the rotor 221.

Here, the second angle $\Theta t$ may be an angle obtained by dividing the entire circumferential angle (ie, 360 degrees) of the circle forming the inner circumferential surface of the housing 221 of the rotor by the total number of magnetic poles.

For example, when the number of poles is 24, the second angle $\Theta t$ may be 15 degrees.

The second angle $\Theta t$ may be an angle between a third surface of one permanent magnet and a third surface of the other permanent magnet of two permanent magnets adjacent to each other at the center of the housing.

The second angle $\Theta t$ may be an angle between a fourth surface of one permanent magnet and a fourth surface of the other permanent magnet of two permanent magnets adjacent to each other at the center of the housing.

The inner circumferential surface of the housing 221 of the rotor may have a plurality of regions corresponding to the number of magnetic poles. The plurality of areas may be areas divided by a second angle from the center c of the housing.

That is, the plurality of permanent magnets may be disposed in the plurality of regions divided by the second angle, respectively, and spaced apart by a distance corresponding to the third angle.

When a plurality of permanent magnets having a width corresponding to the first angle are disposed on the inner circumferential surface of the housing 221 of the rotor based on the second angle $\Theta t$, it may be spaced apart from the third angle ($\Theta t - \Theta p$) corresponding to a certain distance.

For example, when the first angle $\Theta p$ is 11.4 and the second angle $\Theta t$ is 15 degrees, the third angle may be 3.6 degrees.

That is, the plurality of permanent magnets may be spaced apart by a third angle with respect to the center c of the circle forming the inner circumferential surface of the housing 221 of the rotor.

This third angle may be an angle corresponding to a certain distance between the sides of the two permanent magnets.

Each of the plurality of permanent magnets may have a pole-arc-to-pole-pitch ratio $\alpha_p$ corresponding to the first angle Θp and the second angle Θt. This pole-arc-to-pole-pitch ratio can be obtained as follows.

Pole-arc-to-pole-pitch ratio $(\alpha_p)=\Theta p/\Theta t$

The pole-arc-to-pole-pitch ratio of the embodiment may have a value between approximately 0.67 and 0.87.

For example, when the second angle Θt is 15 degrees and the first angle Θp is 11.4 degrees, the pole-arc-to-pole-pitch ratio may be 0.76.

The plurality of permanent magnets may have a rectangular plate shape, a tile shape, or a trapezoidal shape.

The plurality of permanent magnets may be formed in the same size and the same shape with each other. Accordingly, only one permanent magnet will be described. In addition, it demonstrates, for example, when a permanent magnet is formed in the tile shape.

Figure 6A:
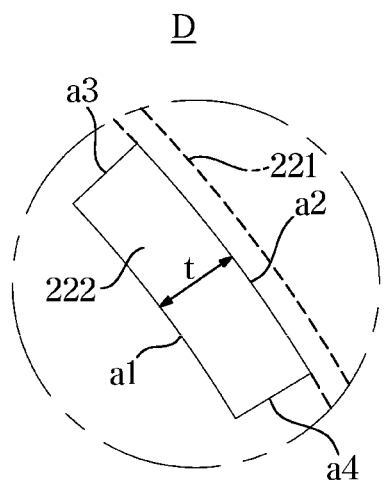
FIG. 6A is an exemplary diagram of a permanent magnet of the rotor shown in FIG. 5.

As shown in FIG. 6A, each permanent magnet may have a plurality of surfaces. That is, the plurality of surfaces of the permanent magnet 222 may have a first surface a1 adjacent to the slot of the stator, a second surface a2 adjacent the inner surface of the housing 221, a third surface (a3) adjacent to each other with different magnetic polarity but adjacent to the permanent magnet disposed on one side, and a fourth surface a4 adjacent to the permanent magnet disposed on the other side.

Since the permanent magnet is tiled, the first and second surfaces can be circular arc surfaces.

The first surface a1 may be a magnetic pole surface or a void surface.

The first surface a1 may have a length corresponding to a preset first radius R1 and a first angle Θp. The length here may be the length of the width of the inner side of the permanent magnet.

Figure 6B:
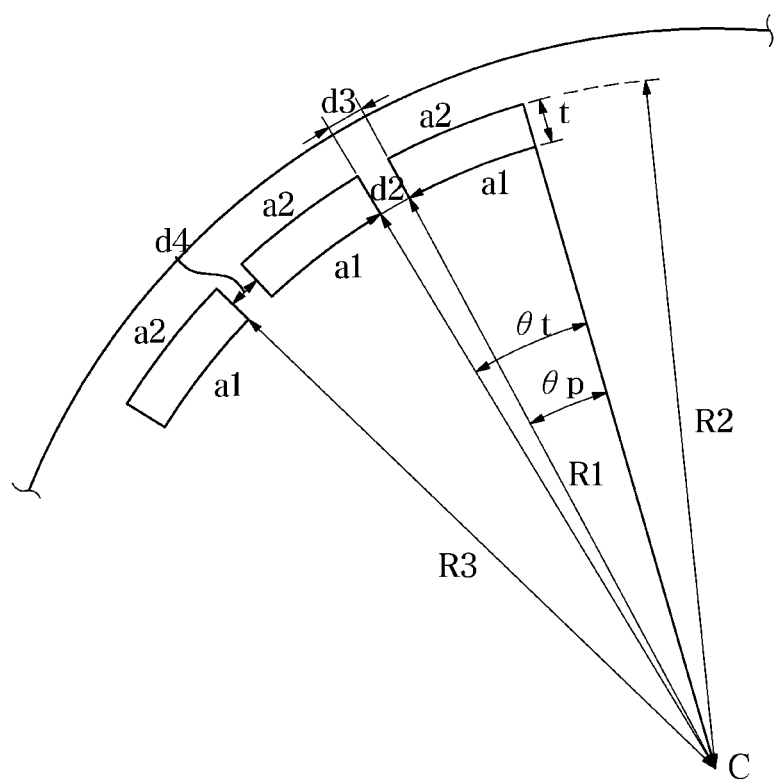
FIG. 6B is an exemplary layout of the permanent magnet of the rotor shown in FIG. 6A.

The structure of each permanent magnet will be described with reference to FIG. 6B.

The length L1 of the first surface a1 may be 2πR1*(Θp/360°).

The first surface a1 may have a length of about 19.200 mm.

In addition, the first radius may be a distance from the center c of the circle forming the inner circumferential surface of the housing 221 to the first surface.

In addition, the first radius may be a distance from the center c of the circle forming the inner circumferential surface of the housing 221 to the point where the first surface and the third surface (or the fourth surface) meet. In other words, the circle connecting the first surfaces a1 of the plurality of permanent magnets may be a circle having a first radius at the center c of the circle forming the inner circumferential surface of the housing 221.

In addition, the first radius R1 may be a radius of an inner circle formed by a plurality of permanent magnets disposed in a circular shape in the housing 221.

The first radius R1 may have a value corresponding to the length L1 of the first surface a1 and the first angle Θp.

For example, the first radius R1 may be 96 mm or more.

When the first angle Θp is 11.4 degrees and the length of the first surface a1 is about 19.2 mm, the first radius R1 may be about 96.5 mm.

The second surface a2 may have a preset second radius R2 and a length L2 corresponding to the first angle Θp. The length L2 may be the length of the width of the outer surface of the permanent magnet.

The length L2 of the second surface a2 may be 2πR2*(Θp/360°).

This second surface a2 may have a length of approximately 20.394 mm.

The second radius R2 may be a distance from the center c of the circle forming the inner circumferential surface of the housing 221 to the point where the second surface and the third surface (or fourth surface) meet.

In other words, the circle connecting the second surfaces a2 of the plurality of permanent magnets may be a circle having a second radius at the center c of the circle forming the inner circumferential surface of the housing 221.

In addition, the second radius R2 may be a radius of an outer circle formed by a plurality of permanent magnets arranged in a circle in the housing.

The second radius R2 may have a value corresponding to the length L2 of the second surface a2 and the first angle Θp.

For example, the second radius R2 may be 102 mm or more.

When the first angle Θp is 11.4 degrees and the length of the second surface a2 is about 20.394 mm, the second radius R1 may be about 102.5 mm.

As such, the second radius may be longer than the first radius.

In addition, the second radius may be about 6 mm or more longer than the first radius.

The first surface and the second surface may be parallel lines to each other.

When the first surface and the second surface are arc surfaces, the first surface and the second surface may be arcs parallel to each other.

That is, the distance between the first surface and the second surface may be about 6 mm or more.

In other words, the distance between the first surface and the second surface is the length of the third and fourth surfaces a3 and a4 and may be about 6 mm or more.

In other words, the thickness t of each permanent magnet may be about 6 mm or more.

The size of the plurality of permanent magnets may be determined by the size of the housing (eg radius), the pole-arc-to-pole-pitch ratio and the number of poles (ie the number of permanent magnets). Also, the distance between the permanent magnets can be determined by the sizes of the plurality of permanent magnets.

Since the plurality of permanent magnets are arranged in a circular shape inside the circular housing, the distance d2 based on the first surfaces of the two permanent magnets adjacent to each other and the distance d3 based on the second surfaces of the two permanent magnets adjacent to each other may be different from each other.

Here, the distance d3 is the distance between the outermost points of the surfaces between the two permanent magnets and the distance d2 is the distance between the innermost points of the distance between the surfaces that the two permanent magnets face.

Also, the distance d4 between the center points of the distances between the two permanent magnets may be different.

That is, the distance between the surfaces of two different permanent magnets facing each other may correspond to a radius based on the center c of the circle forming the inner circumferential surface of the housing 221 of the rotor.

In addition, the plurality of permanent magnets may have the same distance (d2, d3, d4) between the facing surfaces.

For example, the distance d2 between the surface facing the first permanent magnet and the second permanent magnet may be equal to the distance d2 between the surface facing the second permanent magnet and the third permanent magnet, and the distance d3 between the surface facing the first and second permanent magnets may be equal to the distance d3 between the surface facing the second and third permanent magnet, and the distance d4 between the surface facing the first permanent magnet and the second permanent magnet may also be equal to the distance d4 between the surface facing the second permanent magnet and the third permanent magnet.

The arrangement structure of the plurality of permanent magnets will be described in more detail with reference to FIG. 6B. In addition, the case where the shapes of the plurality of permanent magnets are tiled will be described.

The lengths L1 and L2 of the first and second surfaces of the plurality of permanent magnets may be determined by the pole-arc-to-pole-pitch ratio, the second radius, the number of the permanent magnets, and the thickness t of the permanent magnets.

Here, the second radius is the radius of the region where the permanent magnet is disposed in the housing and may be the outermost radius.

If this is expressed as an equation, it is as follows.

$$\text{pole-arc-to-pole-pitch ratio } (\alpha_p) = \Theta p/\Theta t \quad \text{(Equation 1)}$$

$$\text{Second angle } (\Theta t) = \text{number of permanent magnets}/360° \quad \text{(Equation 2)}$$

The first angle Θp can be obtained from the equations (1) and (2).

$$\text{Length of second surface } (L2) = 2\pi R2 *(\Theta p/360)° \quad \text{(Equation 3)}$$

$$\text{Length of second surface } (L2) + \text{distance between two permanent magnets } (d3) = 2\pi R2 *(\Theta t/360)° \quad \text{(Equation 4)}$$

From equations 3 and 4, the distance d3 between the two permanent magnets can be obtained.

$$\text{Length of first surface } (L1) = 2\pi R1 *(\Theta p/360)° \quad \text{(Equation 5)}$$

$$\text{Length of first surface } (L1) + \text{distance between two permanent magnets } (d2) = 2\pi R1 *(\Theta t/360)° \quad \text{(Equation 6)}$$

From Equation 3 and Equation 5, it can be seen that (L1/L2)=(R1/R2), from this it can be seen that the length of the first surface is determined by the first radius. In other words, the first radius can be determined by the length of the first surface.

In addition, the distance d2 may be determined by the first radius and the length of the first surface.

The thickness of the permanent magnet of the present embodiment may be 6 mm or more. This corresponds to the difference between the first radius and the second radius, and the first radius can be obtained from the thickness t of the second radius and the permanent magnet, and from the first radius, the length and distance of the first surface d2 can be obtained.

When first angle Θp is 11.4 degrees, the second angle is 15 degrees, pole-arc-to-pole-pitch ratio is 0.76, and the first radius R2 is approximately 102.5 mm, the length L2 of the second surface a2 may be approximately 20.394 mm. In this case, the distance d3 may be about 6.55 mm.

When the first angle Θp is 11.4 degrees, the second angle is 15 degrees, pole-arc-to-pole-pitch ratio is 0.76, and the thickness of the permanent magnet is 6 mm, the first radius R1 may be approximately 96.5 mm, and the length L1 of the first surface a1 may be approximately 19.2 mm. In this case, the distance d2 may be approximately 6.173 mm.

In addition, the distance d4 between the centers of the surfaces among the distances between two permanent magnets facing each other may be determined by a third radius, which is an intermediate radius between the first and second radius.

For example, the third radius may be approximately 99.5 mm.

When the first angle Θp is 11.4 degrees, the second angle is 15 degrees, the pole-arc-to-pole-pitch ratio is 0.76, and the third radius R3 is 99.5 mm, the distance d4 between the center of the facing surfaces may be approximately 6.25 mm.

For example, the plurality of permanent magnets may be disposed to have a distance d2 between the facing surfaces of the plurality of permanent magnets approximately 6.173 mm, and to have the distance d3 between the facing surfaces between the plurality of permanent magnets approximately 6.55 mm.

In addition, the plurality of permanent magnets may be arranged such that the distance d4 between the facing surfaces between the plurality of permanent magnets becomes approximately 6.25 mm.

That is, the plurality of permanent magnets of the embodiment may be spaced apart at a distance of about 6.25 mm.

In other words, the plurality of permanent magnets may be spaced apart from each other based on the second angle Θt and spaced apart from each other by a third angle Θt−Θp with respect to the center of the circle forming the inner circumferential surface of the housing.

$$\text{Distance between innermost points of the facing surfaces } (d2) = (2\pi R1(\Theta t - \Theta p))/360° \quad \text{(Eq. 7)}$$

$$\text{Distance between the outermost points of the facing surfaces } (d3) = (2\pi R2(\Theta t - \Theta p))/360° \quad \text{(Equation 8)}$$

From Equations 7 and 8, the relationship between the distance d2 between the innermost point and the first radius R1 and the relationship between the distance d3 between the outermost point and the second radius R2 can be seen.

$$\text{Distance between innermost points of the facing surfaces } (d2) = 0.017 * R1(\Theta t - \Theta p)$$

$$\text{Distance between the outermost points of the facing surfaces } (d3) = 0.017 * R2(\Theta t - \Theta p)$$

Assume that the first angle Θp is 11.4 degrees and the second angle is 15 degrees.

$$\text{Distance between innermost points of the facing surfaces } (d2) = 0.0628 * R1$$

$$\text{Distance between the outermost points of the facing surfaces } (d3) = 0.0628 * R2$$

Once the distance between the surfaces of the permanent magnets facing each other is determined, the distance between the spacing reference points can be determined by the radius from the center of the circle (c) forming the inner circumferential surface of the housing 221 to the determined separation reference point and the first and second angles.

That is, the plurality of permanent magnets may be spaced apart based on a distance between the radius of the separation reference point and the separation reference point determined by the first and second angles.

In addition, the height of the permanent magnet corresponding to the rotor direction of the rotor and the thickness of the permanent magnet corresponding to the vertical direction of the stack may be variously changed.

Figure 7:
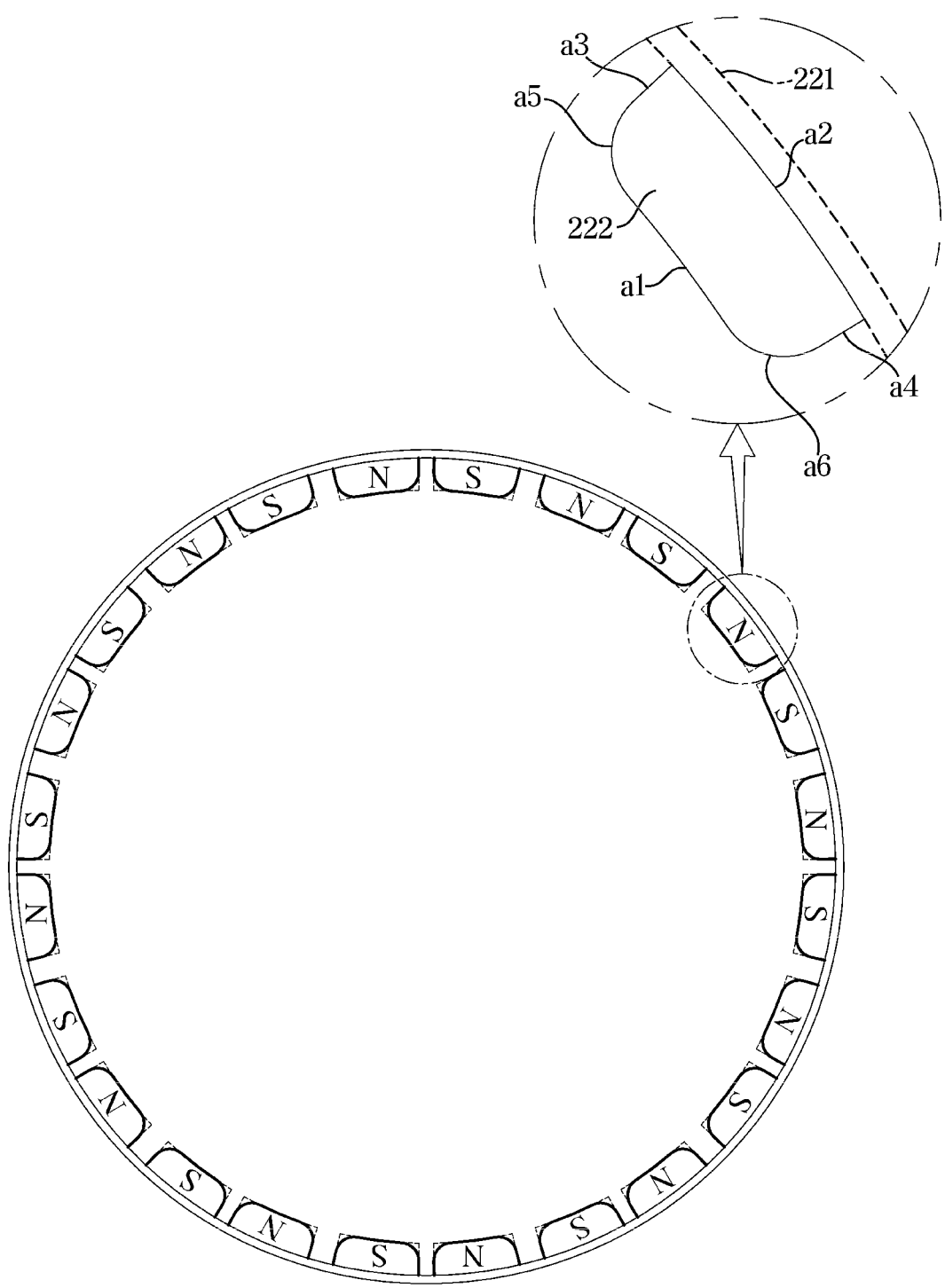
FIG. 7 is an exemplary view of an alternative example of the shape of the permanent magnet of the rotor of the motor provided in the washing machine according to one embodiment.

As shown in FIG. 7, in the plurality of permanent magnets, both side surfaces a3 and a4 may be formed in a curved shape.

More specifically, the permanent magnet 222 may have an edge portion where the first arc surface a1 and the first side surface a3 meet, and a corner portion where the first arc surface a1 and the second side surface a4 meet which may be formed in a curved shape.

That is, the permanent magnet 222 includes a first curved surface a5 provided between the first arc surface a1 and the first side surface a3, and a second curved surface a6 provided between the first arc surface a1 and the second side surface a4.

Through this, the waveform of the pore flux density by the permanent magnets having different magnetic polarities may be in the shape of a sine wave.

As in the present embodiment, it has the same number as the number of magnetic poles on the basis of the void surface, by using a plurality of permanent magnets spaced apart from each other by a certain distance or a certain angle (that is, three angles), cogging torque and torque ripple of the motor can be reduced.

Figure 8:
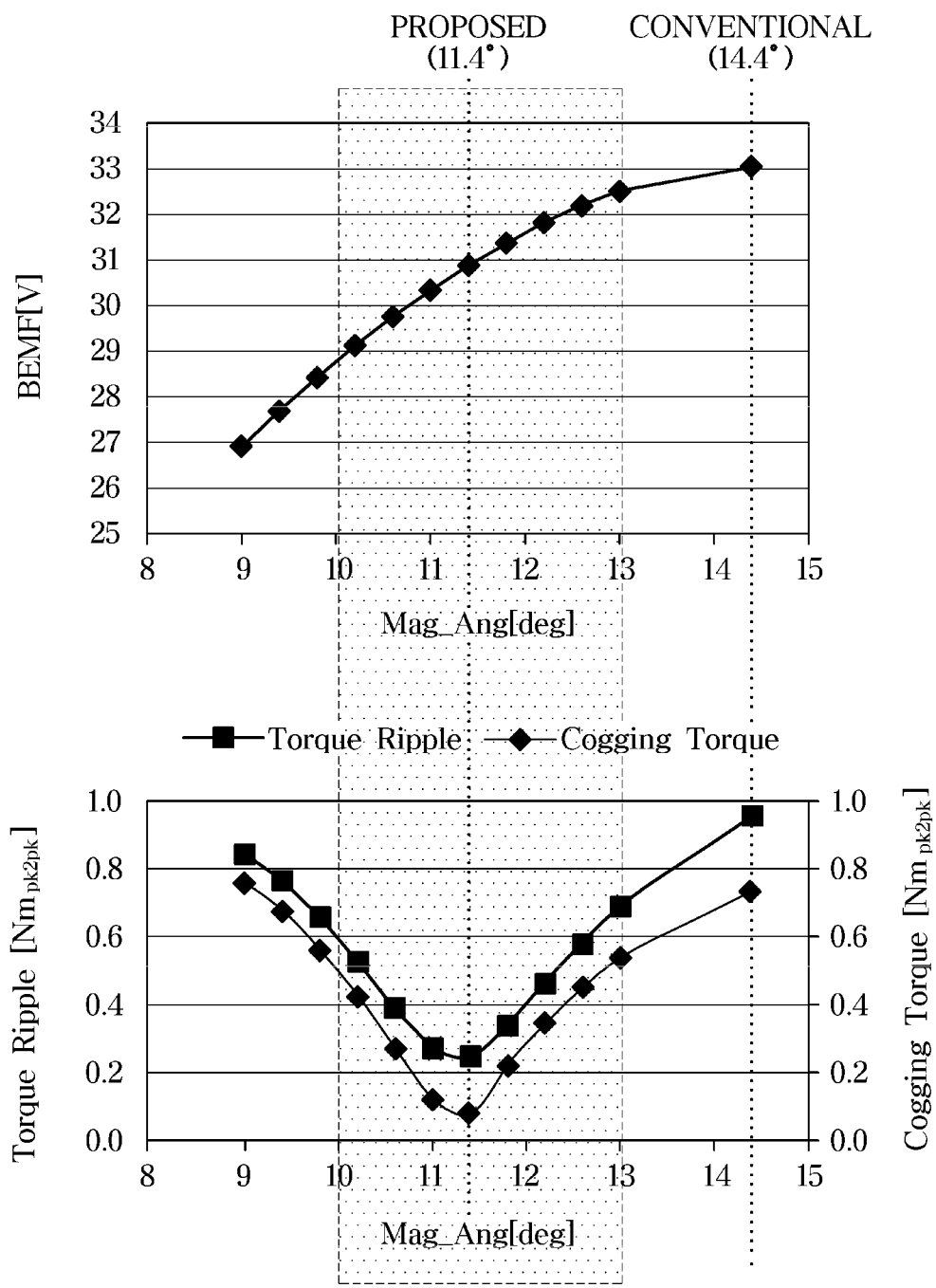
FIG. 8 shows a graph of counter electromotive force, cogging torque, and torque ripple of a motor provided in a washing machine according to one embodiment, and a graph of cogging torque and torque ripple of a motor provided in a conventional washing machine.

That is, as shown in FIG. 8, by having the permanent magnet of the rotor of the motor having a width corresponding to the angle of approximately 11.4 degrees, it can be seen that the cogging torque and torque ripple is greatly reduced compared to the counter electromotive force reduction.

Cogging torque is the torque generated by the magnetic force between the permanent magnet of the rotor and the slot of the stator, and it may be the angle of the permanent magnets that are forced at a certain angle when the motor is not applied with electricity.

Figure 9A:
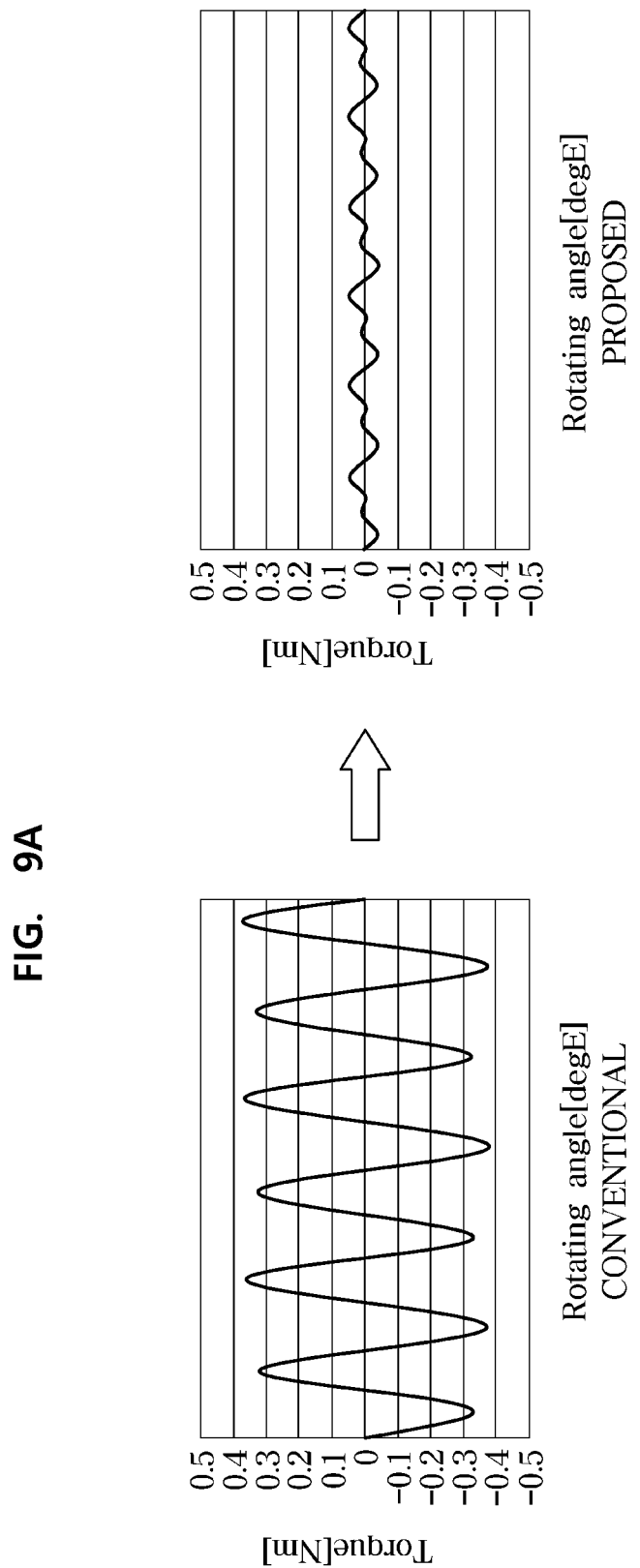
FIG. 9A is a detailed graph of cogging torque of a motor provided in a washing machine according to one embodiment and a detailed graph of cogging torque of a motor provided in a conventional washing machine.
Figure 9B:
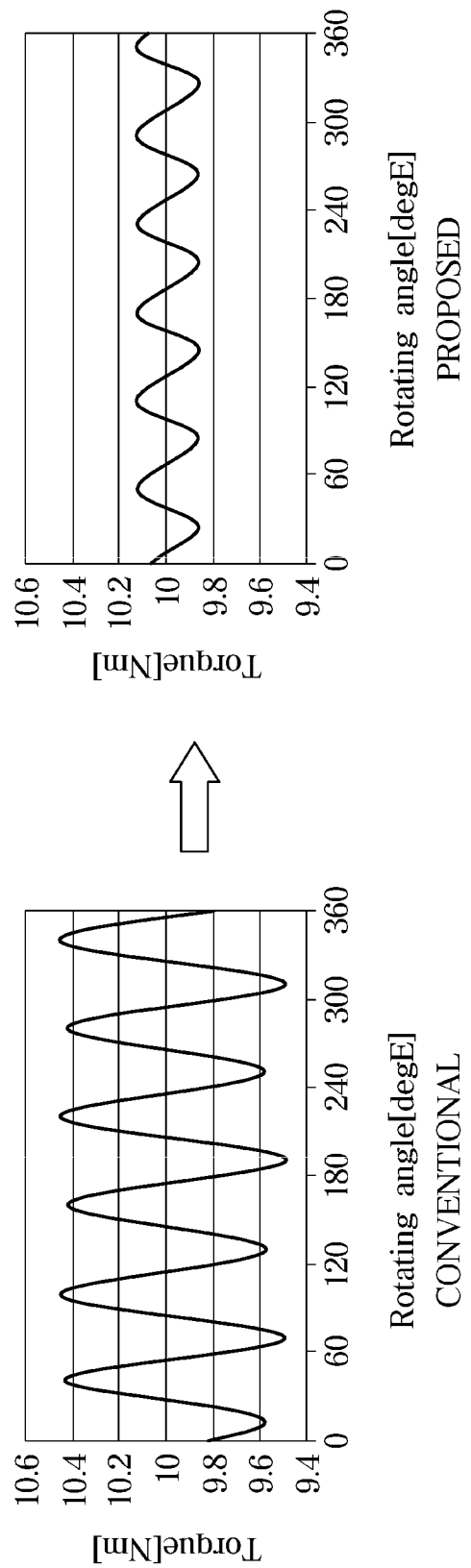
FIG. 9B is a detailed graph of torque ripple of a motor provided in a washing machine according to an embodiment and a detailed graph of torque ripple of a motor provided in a conventional washing machine.

Referring to FIGS. 9A and 9B, when looking at cogging torque and torque ripple, it can be seen that the cogging torque in this proposed embodiment decreases from the conventional 0.74 newton meter (Nm) to 0.08 newton meter (Nm), and it can be seen that the torque ripple decreases from the conventional 0.95 Newton meter (Nm) to 0.25 Newton meter (Nm).

Figure 10A:
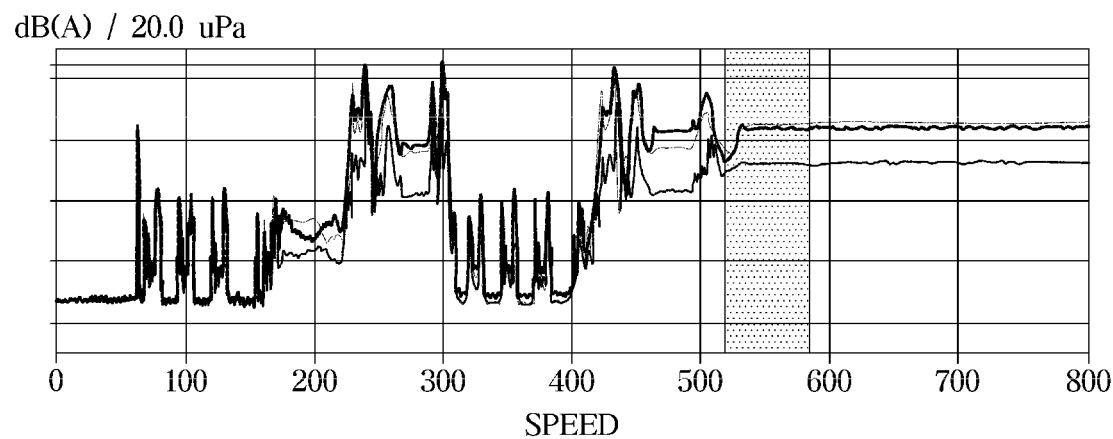
FIGS. 10A and 10B are graphs illustrating a noise measurement of a washing machine according to an embodiment and a noise measurement of a conventional washing machine.
Figure 10B:
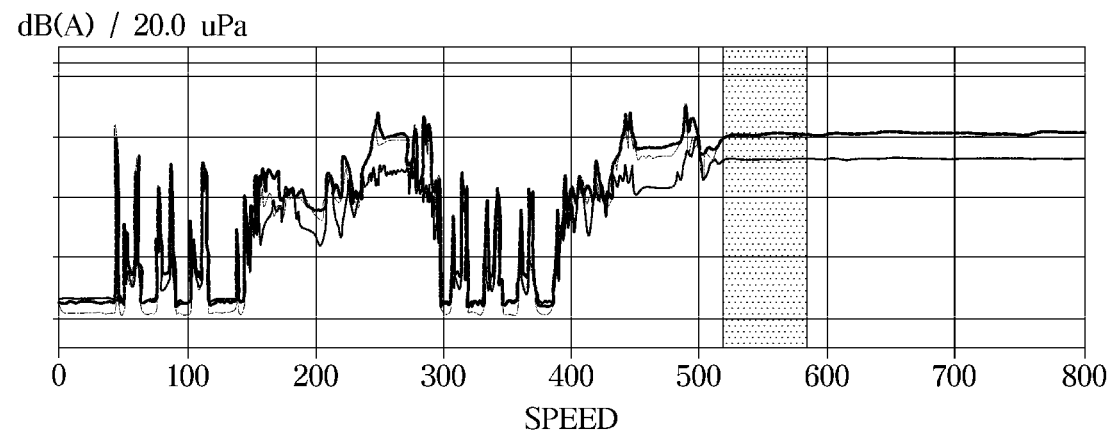

As shown in FIGS. 10A and 10B and 11, the noise in the washing stroke of the washing machine is reduced from 49.4 dBA to 48.4 dBA. During dehydration stroke, the noise during acceleration decreases from 55.7 dBA to 43.1 dBA. It can be seen that the noise at constant speed during the dehydration stroke is reduced from 50.0 dBA to 48.7 dBA.

As the gap between the permanent magnets is widened, a jig can be used for assembly. This makes it possible to keep the gap between the permanent magnets constant and facilitate assembly. In addition, the bond application can be confirmed with the naked eye to minimize the occurrence of quality defects in the manufacturing process.

In addition, during the permanent magnet magnetization process, dead zones that may affect vibration and noise may be prevented from occurring.

In addition, as the amount of permanent magnets is reduced, the weight of the rotor is reduced, thereby improving starting and acceleration and deceleration characteristics.

Figure 12:
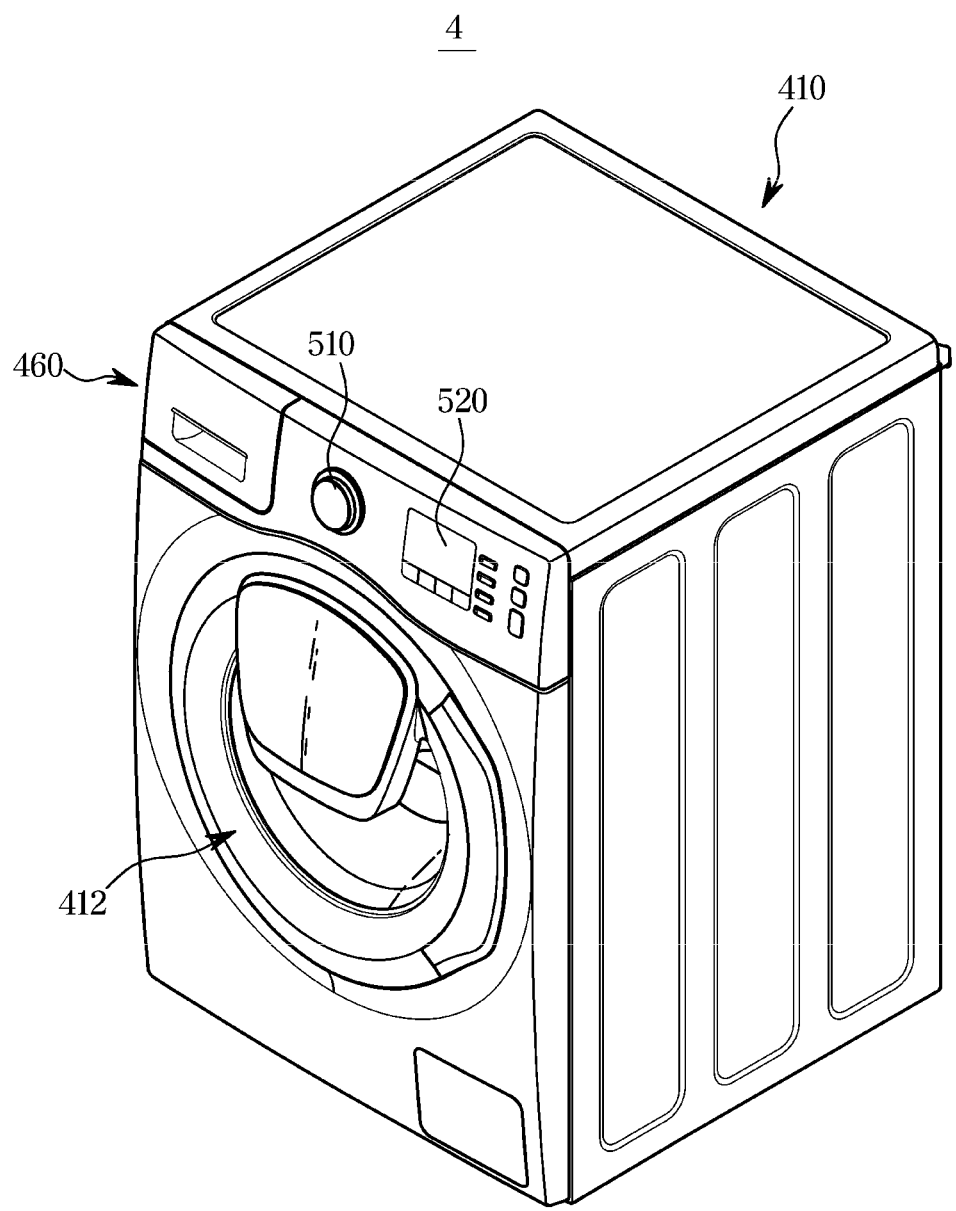
FIG. 12 is an exemplary view of a washing machine according to another embodiment.
Figure 13:
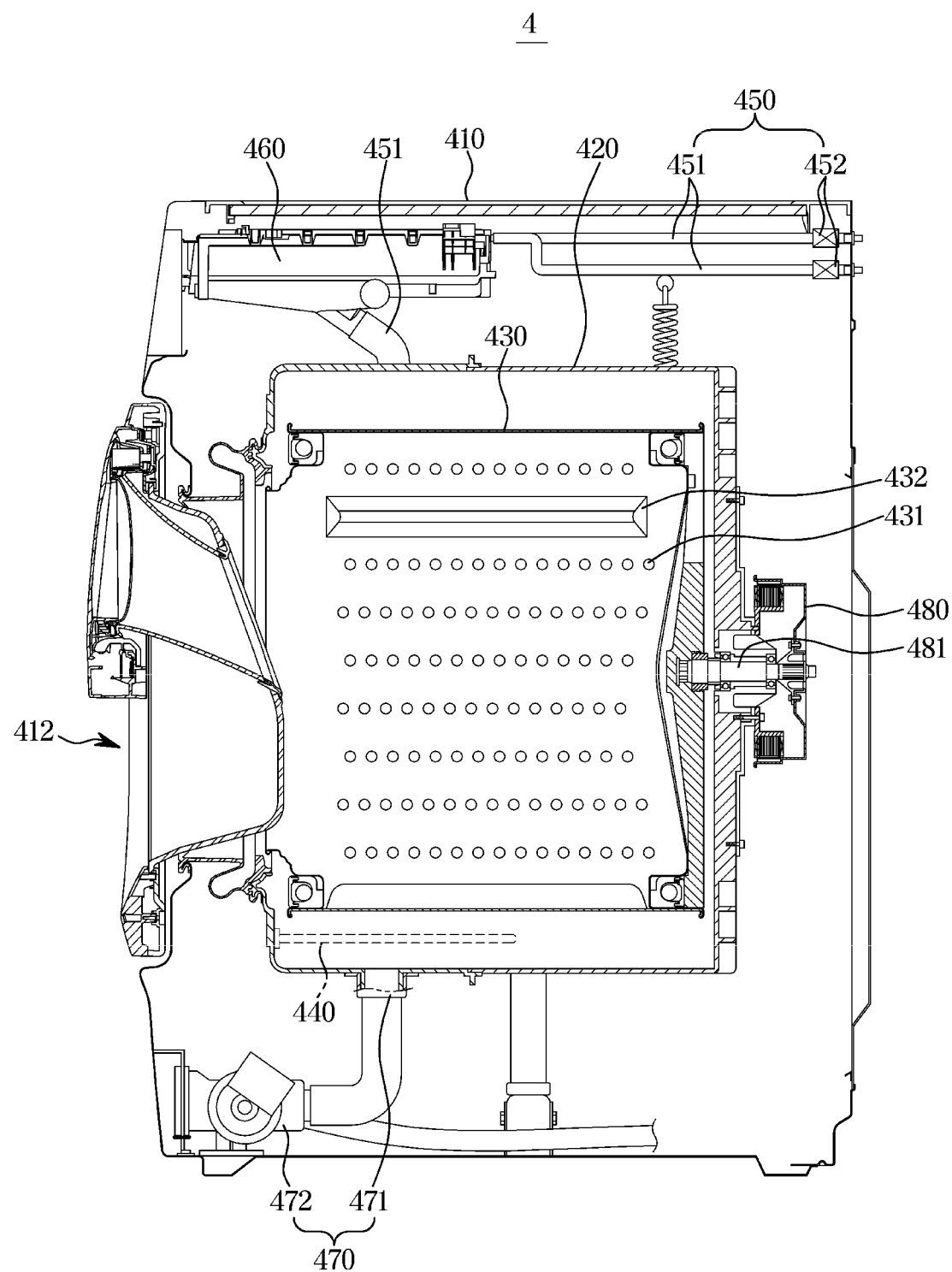
FIG. 13 is a cross-sectional view of a washing machine according to another embodiment.

FIG. 12 is an exemplary view of a washing machine according to another embodiment, and FIG. 13 is a cross-sectional view of the washing machine shown in FIG. 12.

The washing machine 4 of another embodiment may be a front loading washing machine in which laundry inlets are formed in front of the main body.

The washing machine 4 of another embodiment may also perform a drying stroke in addition to the washing, rinsing and dehydrating strokes. In addition, another embodiment may be a dryer that performs only a drying stroke.

As shown in FIG. 13, the washing machine 4 includes a cabinet 410, a water tank 420, a rotating tub 430, a heating part 440, a water supply part 450, a detergent supply part 460, and a drain part 470 and motor 480.

Cabinet 410 is to form the appearance of the washing machine 4, one side is formed with an inlet for putting in and take out the laundry.

The cabinet 410 is equipped with a door 412 for opening and closing the inlet, and a gasket (not shown) for sealing between the door 412 and the inlet may be mounted on the circumferential surface of the inlet.

The water tank 420 is fixedly installed in the cabinet 410 and accommodates water supplied from the water supply unit 460.

The outer side of the water tank 420 may be equipped with a motor 480 for rotating the rotating tub (430).

The rotating tub 430 is positioned inside the tub 420 in a shape corresponding to that of the water tank 420. The rotation shaft 481 is mounted to the outside of the rotating tub 430, and the rotation shaft 481 may extend to the outside of the water tank 420 to be connected to a motor 480 mounted to the outside of the water tank 420. The rotating shaft 481 transmits the driving force of the motor 480 to the rotating tub 430.

Accordingly, the rotating tub 430 may be rotated clockwise or counterclockwise within the water tank 420 by the driving force of the motor 480.

An opening is formed in one surface of the rotating tub 430, and a plurality of holes 431 are formed in the other surface. The rotating tub 430 accommodates laundry through an opening when the door 412 is opened, and allows water to flow through a plurality of holes formed in the remaining surface.

That is, the plurality of holes 431 allow the water in the water tank 420 to flow into the rotating tub 430, and also allow the water inside the rotating tub 430 to be discharged to the water tank 420.

A plurality of lifters 432 may be installed on the inner circumferential surface of the rotating tub 430 to allow the laundry to rise and fall when the rotating tub 430 rotates.

The washing machine may wash laundry using hot water.

In addition, the washing machine may further include a heating part 440 provided in the water tank 420 to heat the water in the water tank 420. The heating part 440 may include at least one heater.

The washing machine may further include a temperature detector (not shown) for sensing the temperature of the heated water, and may control the operation of the heater based on the temperature of the water detected by the temperature detector.

The water supply part 450 includes a water supply pipe 451 and a water supply valve 452.

Here, one end of the water supply pipe 451 may be connected to an external water pipe (not shown), and the other end may be connected to the detergent supply part 460. The water supply pipe 451 receives water from an external water pipe and guides it into the detergent supply part 460.

The water supply line 461 may be connected between the detergent supply part 460 and the water tank 420. The water supply pipe 461 guides the water supplied from the external water pipe into the water tank 420 and the rotating tub 430 together with the detergent of the detergent supply part 460.

The water supply valve 462 is opened and closed during the washing and rinsing stroke to adjust the amount of water supplied into the water tank 420 and the rotating tub 430.

Detergent supply part 460 stores detergent dispensed by the user. That is, the detergent supply part 460 may store at least one of a synthetic detergent, a fabric softener, and a bleach.

The detergent supply part 460 allows the water to flow into the water supply pipe 451 together with the detergent when water is introduced through the water supply pipe 451 during the washing stroke The drain part 470 includes a drain pipe 471 and a drain pump 472.

The drain pipe 471 may be provided below the water tank 420.

The drain pump 472 pumps water inside the water tank 420 and the rotating tub 430 during the drainage and dehydration stroke. Drain pump 482 works as water in the water tank 420 and the rotating tub 430 is introduced along the drain pipe 471, and the introduced water is guided to the outside through the drain pipe 471 so that the water in the water tank 420 and the rotating tub 430 is discharged to the outside when pumping.

The motor 480 is driven at the time of sensing the weight of the laundry, at the washing stroke, at the rinsing stroke, at the dehydration stroke, and at the drying stroke, and rotates the rotating tub 430 with the rotational force according to the driving so that the laundry contained in the rotating tub 430 is washed, rinsed, dehydrated, and dried.

The motor 480 may generate a rotational force from the power of an external power source, and transmit the rotational force to the rotating tub 430 through the rotation shaft 481.

The motor 480 may be a direct current motor (DC motor).

The washing machine may include an input 510 for receiving an operation command and a display 520 for displaying operation information of the washing machine.

The structural configuration of the motor provided in the washing machine according to another embodiment is different only from the structure combined with the clutch, and the structural configuration of the motor having the rotor and the stator is the same as the embodiment.

The motor 480 includes a stator (ie, a stator) and a rotor (ie, a rotor) disposed on the outer circumference of the stator. That is, the motor may be an outer rotor type motor.

The stator may include an annular base, a core disposed along the outer periphery of the base, a plurality of slots protruding outward from the core with respect to the radial direction of the stator, and a coil wound around each of the plurality of slots.

Here, the coil may generate a magnetic field by the current flowing through the coil, and the plurality of slots may be magnetized by the generated magnetic field. The rotor wraps the stator outside the stator.

The rotor includes a housing that forms the exterior of the rotor and includes a plurality of permanent magnets disposed on an inner surface of the housing.

The plurality of permanent magnets may have a first magnetic polarity or a second magnetic polarity.

That is, the permanent magnet of the first magnetic polarity and the permanent magnet of the second magnetic polarity may be alternately disposed on the inner surface of the housing.

Here, the first magnetic polarity and the second magnetic polarity may be different polarities, the first magnetic polarity may be N polarity, and the second magnetic polarity may be S polarity.

The plurality of permanent magnets may be arranged to face the slots of the stator in the rotor housing. In this case, the permanent magnets may be disposed with a gap G at a predetermined distance from the slot of the stator.

As described above, the structure of the motor 480 provided in the washing machine of the front loading method may be the same as that of the motor 200 provided in the washing machine of the top loading method. Accordingly, a detailed description of the structure of the motor 480 provided in the front loading washing machine will be omitted.

In addition, another embodiment has been described with respect to the front-loading washing machine, the structure of the motor of one embodiment may be implemented in the motor of the dryer.

In addition, the motor of the present embodiment may be a motor provided in the cleaner, a motor provided in the refrigerator, a motor provided in the air conditioner. That is, the structure of the motor of the embodiment may be the same as the structure of the motor provided in the cleaner, the motor provided in the refrigerator, and the motor provided in the air conditioner.

On the other hand, the disclosed embodiments may be implemented in the form of a recording medium for storing instructions executable by a computer. Instructions may be stored in the form of a program code, and when executed by a processor, may generate a program module to perform the operations of the disclosed embodiments. The recording medium may be implemented as a computer-readable recording medium.

The computer-readable recording medium includes all kinds of recording media having stored thereon instructions which can be read by a computer. For example, there may be read only memory (ROM), random access memory (RAM), a magnetic tape, a magnetic disk, a flash memory, an optical data storage device, and the like.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A motor, comprising:
   a stator having slots around which coils are wound; and
   a rotor comprising a housing having a circular shape and accommodating the stator and a plurality of permanent magnets disposed on an inner surface of the housing to be spaced apart from each other while facing the slots, the plurality of permanent magnets provided corresponding in number to a number of magnetic poles and having different magnetic polarities,
   wherein each of the plurality of permanent magnets has a length corresponding to a first angle according to the number of magnetic poles,
   the plurality of permanent magnets are spaced apart from each other at a third angle according to the first angle and a second angle corresponding to the number of magnetic poles, and wherein
   the first, second, and third angles of the motor have a center point of the housing as an angle reference point.

2. The motor of claim 1, wherein the plurality of permanent magnets are disposed such that magnetic polarities of surfaces of the plurality of permanent magnets facing the slots are alternatively indicated as a first magnetic polarity and a second magnetic polarity.

3. The motor of claim 1, wherein each of the permanent magnets includes
a first surface adjacent to the slot, a second surface adjacent to an inner circumferential surface of the housing, a third surface connecting one side of the first surface to one side of the second surface, and a fourth surface connecting an other side of the first surface to an other side of the second surface, and
the first angle is an angle between a line connecting to the third surface and a line connecting to the fourth surface of each of the permanent magnets at the center point of the housing, and
the third angle is an angle between lines respectively connecting to opposing surfaces of two permanent magnets adjacent to each other among the plurality of permanent magnets at the center point of the housing.

4. The motor of claim 3, wherein the first surface has a length corresponding to a first radius from the center point of the housing to the first surface and the first angle, and
the second surface has a length corresponding to a second radius from the center point of the housing to the second surface and the second angle.

5. The motor of claim 3, wherein
the first angle is between 10 and 13 degrees,
the second angle is an angle obtained by dividing the number of the magnetic poles by 360 degrees, and
the third angle is an angle obtained by subtracting the first angle from the second angle.

6. The motor of claim 5, wherein the plurality of permanent magnets are spaced apart from each other at a distance corresponding to the third angle.

7. The motor of claim 3, wherein the preset pole-arc-to-pole-pitch ratio is a value in a range of 0.67 to 0.87,
the length of the first surface is approximately 19.200 mm, and
the length of the second surface is approximately 20.394 mm.

8. The motor of claim 3, wherein the length of the third surface and the fourth surface are approximately 6 mm.

9. The motor of claim 1, wherein each of the permanent magnets includes a first surface adjacent to the slot, a second surface adjacent to an inner circumferential surface of the housing, a third surface connecting one side of the first surface to one side of the second surface, and a fourth surface connecting an other side of the first surface to another side of the second surface, a first curved surface provided between the first surface and the third surface, and a second curved surface provided between the second surface and the fourth surface.

10. The motor of claim 1, wherein a ratio of the number of the plurality of the permanent magnets to the number of slots is 4:3.

11. A washing machine, comprising:
a tub;
a rotating tub rotatably disposed in the tub; and
a motor configured to apply driving force to the rotating tub, and comprising a stator having slots wound with coils and a rotor including a housing having a circular shape and accommodating the stator and a plurality of permanent magnets disposed on an inner surface of the housing to be spaced apart from each other while facing the slots, the plurality of permanent magnets provided corresponding in number to a number of magnetic poles and having different magnetic polarities,
wherein each of the plurality of the permanent magnets has a length corresponding to the number of magnetic poles, a preset pole-arc-to-pole-pitch ratio, and a preset radius, and
wherein the plurality of the permanent magnets are spaced apart from each other at a distance corresponding to the determined length, the number of magnetic poles, and the preset radius.

12. The washing machine according to claim 11 further comprising:
a pulsator rotatably disposed in the rotating tub; and
wherein the motor delivers the driving force selectively to the rotating tub and the pulsator.

13. The washing machine according to claim 11, wherein the preset pole-arc-to-pole-pitch ratio is a value in a range of 0.67 to 0.87,
the preset radius is about 99.5 mm, and
the determined length is approximately 6.25 mm.

14. The washing machine according to claim 11, wherein the determined length is a length corresponding to a first angle determined by the number of magnetic poles and the preset pole-arc-to-pole-pitch ratio, and
the determined distance is a distance corresponding to the first angle and a third angle determined by a second angle corresponding to the number of magnetic poles, and
the first angle is an angle between lines respectively connecting to opposite side surfaces of each of the permanent magnets at a center point of the housing, and
the third angle is an angle between lines respectively connecting to opposing surfaces of two permanent magnets adjacent to each other among the plurality of permanent magnets at the center point of the housing.

15. The washing machine according to claim 11, wherein a ratio of the number of the plurality of the permanent magnets to the number of the slots is 4:3.

16. The washing machine of claim 11, wherein the motor is a motor of a direct drive (DD) system.

17. The washing machine of claim 11, wherein the rotor of the motor is disposed outside the stator.

* * * * *